(12) United States Patent
Thompson et al.

(10) Patent No.: US 9,898,865 B2
(45) Date of Patent: Feb. 20, 2018

(54) SYSTEM AND METHOD FOR SPAWNING DRAWING SURFACES

(71) Applicant: Microsoft Technology Licensing, LLC, Redmond, WA (US)

(72) Inventors: Joe Thompson, Seattle, WA (US); Dan Osborn, Woodinville, WA (US); Tarek Hefny, Redmond, WA (US); Stephen G. Latta, Seattle, WA (US); Forest Woodcroft Gouin, Seattle, WA (US); James Nakashima, Kirkland, WA (US); Megan Saunders, Kirkland, WA (US); Anatolie Gavriliuc, Kirkland, WA (US); Alberto E. Cerriteno, Bothell, WA (US); Shawn Crispin Wright, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 35 days.

(21) Appl. No.: 14/746,789

(22) Filed: Jun. 22, 2015

(65) Prior Publication Data
US 2016/0371886 A1    Dec. 22, 2016

(51) Int. Cl.
*G09G 5/00* (2006.01)
*G06T 19/00* (2011.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ..... G06T 19/006; G06T 11/203; G06T 19/20; G06T 2219/2012; G06T 2219/2021;
(Continued)

(56) References Cited

U.S. PATENT DOCUMENTS 6,601,021 B2 *  7/2003  Card ....................... G06F 3/013
                                                    340/3.6
7,881,901 B2 *  2/2011  Fein ...................... G06F 3/0304
                                                    345/156
(Continued)

FOREIGN PATENT DOCUMENTS

EP          2784632 A2    10/2014

OTHER PUBLICATIONS

Pouke, et al., "Gaze Tracking and Non-Touch Gesture Based Interaction Method for Mobile 3D Virtual Spaces", In Proceedings of the 24th Australian Computer-Human Interaction Conference, Nov. 26, 2012, pp. 506-512.
(Continued)

*Primary Examiner* — Michael J Jansen, II
(74) *Attorney, Agent, or Firm* — Alleman Hall Creasman & Tuttle LLP

(57) ABSTRACT

A method for operating a computing device is described herein. The method includes determining a user's gaze direction based on a gaze input, determining an intersection between the user's gaze direction and an identified environmental surface in a 3-dimensional environment, and generating a drawing surface based on the intersection within a user interface on a display.

18 Claims, 8 Drawing Sheets

US 9,898,865 B2
Page 2

(51) Int. Cl.

| | | |
|---|---|---|
| *G02B 27/01* | (2006.01) | |
| *G06F 3/01* | (2006.01) | |
| *G06T 11/20* | (2006.01) | |
| *G06T 19/20* | (2011.01) | |
| *G06F 3/03* | (2006.01) | |

(52) U.S. Cl.
CPC ............ *G06F 3/013* (2013.01); *G06F 3/0304* (2013.01); *G06T 11/203* (2013.01); *G06T 19/20* (2013.01); *G02B 2027/014* (2013.01); *G02B 2027/0138* (2013.01); *G02B 2027/0174* (2013.01); *G02B 2027/0178* (2013.01); *G02B 2027/0187* (2013.01); *G06T 2219/2012* (2013.01); *G06T 2219/2021* (2013.01)

(58) Field of Classification Search
CPC ........ G02B 27/0172; G02B 2027/0138; G02B 2027/014; G02B 2027/0174; G06F 3/013
See application file for complete search history.

(56) References Cited

U.S. PATENT DOCUMENTS

| | | | |
|---|---|---|---|
| 8,228,315 B1* | 7/2012 | Starner | G02B 27/017 345/175 |
| 8,253,685 B2* | 8/2012 | Katayama | G02B 27/017 345/156 |
| 8,300,025 B2* | 10/2012 | Katayama | G01S 5/16 345/156 |
| 8,806,354 B1 | 8/2014 | Hyndman et al. | |
| 8,817,017 B2 | 8/2014 | Vaganov | |
| 8,830,164 B2* | 9/2014 | Sakata | G06F 3/013 345/156 |
| 9,069,164 B2* | 6/2015 | Starner | G02B 27/017 |
| 9,367,142 B2* | 6/2016 | Lee | G06F 3/0304 |
| 2002/0044152 A1* | 4/2002 | Abbott, III | G06T 11/00 345/629 |
| 2002/0103625 A1* | 8/2002 | Card | G06F 3/013 702/187 |
| 2002/0141614 A1* | 10/2002 | Lin | G06F 3/013 382/103 |
| 2004/0128012 A1* | 7/2004 | Lin | G06F 3/011 700/100 |
| 2008/0252850 A1 | 10/2008 | Plagwitz et al. | |
| 2009/0022368 A1* | 1/2009 | Matsuoka | B60K 35/00 382/103 |
| 2009/0033623 A1* | 2/2009 | Lin | G06F 3/014 345/158 |
| 2010/0199232 A1* | 8/2010 | Mistry | G06F 1/163 715/863 |
| 2012/0146895 A1* | 6/2012 | Bjorklund | G06F 3/013 345/156 |
| 2012/0257035 A1 | 10/2012 | Larsen | |
| 2012/0272179 A1 | 10/2012 | Stafford | |
| 2012/0290401 A1* | 11/2012 | Neven | A61B 3/113 705/14.68 |
| 2012/0293548 A1* | 11/2012 | Perez | G06F 3/012 345/633 |
| 2013/0007668 A1* | 1/2013 | Liu | G06F 3/012 715/841 |
| 2013/0016070 A1* | 1/2013 | Starner | G02B 27/017 345/175 |
| 2013/0050258 A1* | 2/2013 | Liu | G06F 3/005 345/633 |
| 2013/0147686 A1* | 6/2013 | Clavin | G06F 3/013 345/8 |
| 2013/0147836 A1 | 6/2013 | Small et al. | |
| 2013/0169560 A1* | 7/2013 | Cederlund | G06F 3/013 345/173 |
| 2013/0246967 A1* | 9/2013 | Wheeler | G06F 3/012 715/784 |
| 2013/0283208 A1 | 10/2013 | Bychkov et al. | |
| 2013/0318457 A1* | 11/2013 | Bjorklund | G06F 3/013 715/765 |
| 2013/0321270 A1* | 12/2013 | Bjorklund | G06F 3/013 345/158 |
| 2013/0326431 A1* | 12/2013 | Bjorklund | G06F 3/013 715/863 |
| 2013/0328925 A1* | 12/2013 | Latta | G09G 3/003 345/633 |
| 2013/0335321 A1* | 12/2013 | Sugita | G06F 3/0488 345/157 |
| 2014/0002352 A1* | 1/2014 | Jacob | G06F 3/013 345/156 |
| 2014/0002491 A1 | 1/2014 | Lamb et al. | |
| 2014/0009390 A1* | 1/2014 | Bjorklund | G06F 3/013 345/156 |
| 2014/0062880 A1* | 3/2014 | Saint-Requier | G06F 3/013 345/158 |
| 2014/0063060 A1* | 3/2014 | Maciocci | G06F 3/011 345/633 |
| 2014/0160001 A1* | 6/2014 | Kinnebrew | G06F 3/012 345/156 |
| 2014/0184494 A1 | 7/2014 | Burachas | |
| 2014/0201666 A1 | 7/2014 | Bedikian et al. | |
| 2014/0218281 A1 | 8/2014 | Amayeh et al. | |
| 2014/0237366 A1* | 8/2014 | Poulos | G06F 3/013 715/728 |
| 2014/0267399 A1* | 9/2014 | Zamer | H04L 67/20 345/633 |
| 2014/0267771 A1* | 9/2014 | Lawler | G06K 9/00597 348/169 |
| 2014/0285404 A1* | 9/2014 | Takano | G06F 3/005 345/8 |
| 2014/0333665 A1* | 11/2014 | Sylvan | G02B 27/0149 345/633 |
| 2014/0333666 A1* | 11/2014 | Poulos | G06T 19/006 345/633 |
| 2014/0361976 A1* | 12/2014 | Osman | G02B 27/0172 345/156 |
| 2014/0372944 A1* | 12/2014 | Mulcahy | G06F 3/04815 715/810 |
| 2015/0015479 A1* | 1/2015 | Cho | G06F 3/013 345/156 |
| 2015/0116203 A1* | 4/2015 | Narita | G06F 3/013 345/156 |
| 2015/0116354 A1* | 4/2015 | Tomlin | G06F 3/011 345/633 |
| 2015/0268799 A1* | 9/2015 | Starner | G02B 27/017 345/175 |
| 2015/0293586 A1* | 10/2015 | Kritt | G06F 3/013 345/158 |
| 2015/0331486 A1* | 11/2015 | Okubo | G06F 3/0346 345/156 |
| 2015/0341400 A1* | 11/2015 | Vong | H04L 65/403 715/753 |
| 2016/0018655 A1* | 1/2016 | Imoto | G06F 3/011 345/8 |
| 2016/0042566 A1* | 2/2016 | Mao | G06T 19/006 463/32 |
| 2016/0054565 A1* | 2/2016 | Izumihara | G09G 5/00 345/8 |
| 2016/0139762 A1* | 5/2016 | Meir | G06F 3/005 345/156 |
| 2016/0147408 A1* | 5/2016 | Bevis | G06F 3/04815 715/850 |
| 2016/0292850 A1* | 10/2016 | Perez | G06F 3/005 |
| 2016/0311115 A1* | 10/2016 | Hill | G06T 7/73 |
| 2016/0311116 A1* | 10/2016 | Hill | G06T 7/73 |
| 2016/0313902 A1* | 10/2016 | Hill | G06F 3/04847 |
| 2016/0314621 A1* | 10/2016 | Hill | G06T 7/73 |
| 2016/0371886 A1* | 12/2016 | Thompson | G02B 27/0172 |

OTHER PUBLICATIONS

Kamp, et al., "Gaze and Voice Controlled Drawing", In Proceedings of the 1st Conference on Novel Gaze-Controlled Applications, May 26, 2011, 8 pages.

(56) References Cited

OTHER PUBLICATIONS

Bowman, et al., "Testbed Evaluation of Virtual Environment Interaction Techniques", In Proceedings of the ACM symposium on Virtual reality software and technology, Dec. 20, 1999, 8 pages.
Stellmach, et al., "Looking at 3D User Interfaces", In Proceedings of CHI Conference on Human Factors in Computing Systems, May 5, 2012, 4 pages.
Mine, Mark R., "Virtual Environment Interaction Techniques", In Technical Report, Mar. 20, 2015, 18 pages.
ISA European Patent Office, International Search Report and Written Opinion Issued in PCT Application No. PCT/US2016/036114, dated Nov. 25, 2016, WIPO, 19 pages.
IPEA European Patent Office, Second Written Opinion Issued in PCT Application No. PCT/US2016/036114, dated Jun. 8, 2017, WIPO, 9 Pages.
"International Preliminary Report on Patentability Issued in PCT Application No. PCT/US2016/036114", dated Sep. 4, 2017, 11 Pages.

* cited by examiner

SYSTEM AND METHOD FOR SPAWNING DRAWING SURFACES

BACKGROUND

Various technologies have recently emerged that allow users to experience virtual environments as well as a blend of reality and virtual worlds. For example, head-mounted display (HMD) devices may include high definition cameras, depth cameras, range finders, gyroscopes, accelerometers, and other technologies that allow the head mounted computing device to display virtual environments or map the real world and to display a blend of reality and virtual objects on the head mounted computing device. This blended view of real-world and virtual reality is referred to as augmented reality. Other types of computing devices can also implement augmented reality as well as virtual reality capabilities such as tablets, smartphones, etc.

Some computing devices enable a user to mark-up various objects, surfaces, etc., in the 3-dimensional environment presented to the user. For instance, some computing devices may enable a user to draw on 3-dimensional surfaces in the 3-dimensional environment. However, surfaces in the environment may have a variety of geometries which may be complex and non-planar, in some instances. Consequently, the user's drawings may not turn out as intended, due to the variations in surface perspective. Therefore, a user may not be able to convey their ideas in a desired manner when performing surface mark-up in the 3-dimensional environment in this way. As a result, a user's interactive experience with the 3-dimensional environment may be negatively impacted.

SUMMARY

In one approach, a method for operating a computing device is provided. The method includes determining a user's gaze direction based on a gaze input, determining an intersection between the user's gaze direction and an identified environmental surface in a 3-dimensional environment, and generating a drawing surface based on the intersection within a user interface on a display. In this way, a drawing surface can be spawned based on a user's gaze direction. As a result, a user can easily and intuitively sketch drawings on a natural surface in an accurate manner. Consequently, drawings with improved quality and look that enable a user's ideas to be clearly conveyed can be provided in the 3-dimensional environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
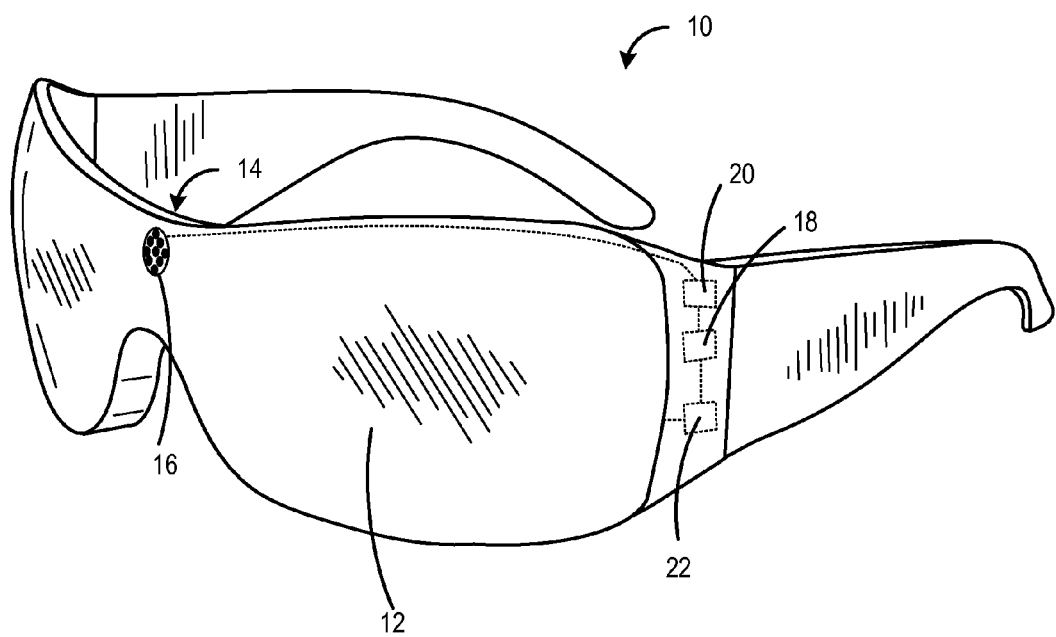
FIG. 1 shows a head mounted display device according to an embodiment of the present disclosure.
Figure 2:
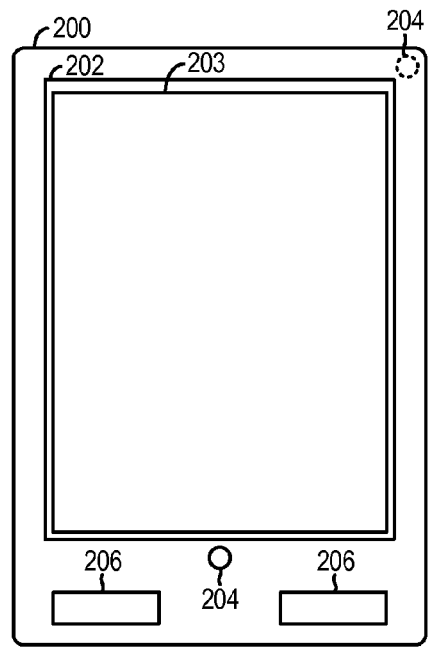
FIG. 2 shows a portable computing device according to an embodiment of the present disclosure.

FIGS. 1 and 2 show two exemplary computing devices that may be used to implement the techniques for determining a direction of a user's gaze and generating drawing surfaces based on an intersection between the gaze direction and an environmental surface, described herein. Generating a drawing surface in this way enables a user to easily and intuitively mark-up a drawing surface associated with a surface in the 3-dimensional environment. It will be appreciated that the drawing surface may be spawned with an orientation and geometry that enables easy mark-up from the user's perspective. Additionally, by placing the mark-up on the drawing surface, the user's mark-up will maintain its viewing integrity when viewed from a variety of viewing angles. This enables the user to convey ideas to others viewing the environment from different perspectives.

Specifically, FIG. 1 illustrates a head mounted computing device 10 according to an example of the present disclosure. In this example, the illustrated head mounted computing device 10 takes the form of wearable glasses or goggles, but it will be appreciated that other forms are possible. The head mounted computing device 10 includes a see-through holographic display 12 that may be configured to visually augment an appearance of a physical environment being viewed by the user through the see-through holographic display. For instance, the see-through holographic display 12 may be configured to present holographic images within the real-world environment seen by the user through the display. Thus, the holographic images may be presented in a user interface overlaying the real-world environment seen through the display.

The head mounted computing device 10 may include an image production system 22 that is configured to display virtual objects to the user with the see-through holographic display 12. The virtual objects are visually superimposed onto the physical environment so as to be perceived at various depths and locations. It will be appreciated that the virtual objects may be included in a user interface. The head mounted computing device 10 may use stereoscopy to visually place a virtual object at a desired depth by displaying separate images of the virtual object to both of the user's eyes. However, the particular method of imparting a perception of depth to the holograms need not be so limited, as numerous holographic display techniques that provide depth perception have been contemplated.

The head mounted computing device 10 includes an optical sensor system 14 that may include one or more optical sensors. In one example, the optical sensor system 14 may include an outward facing optical sensor 16 that may be configured to detect the real-world background from a similar vantage point (e.g., line of sight) as observed by the user through the see-through holographic display 12. The optical sensor system 14 may include a variety of additional sensors, such as a depth camera and an RGB camera, which may be a high definition camera or have another resolution.

The head mounted computing device 10 may further include a position sensor system 18 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 14 and/or position sensor information received from position sensor system 18 may be used to determine a user's gaze direction. For instance, sensors, such as optical sensors, may be configured to track a user's eye position and movement to determine a user's gaze direction. In another example, one or more optical sensors (e.g., cameras) spaced away from the head mounted portion of the device may be used to track a user's eye movement to determine a user's gaze direction. However, other suitable techniques for ascertaining the gaze direction may be used. Additionally, the user's gaze direction may be expressed via two points on a line.

Furthermore, the optical sensor information and the position sensor information may be used by the head mounted computing device to perform analysis of the real-world background, such as depth analysis, surface reconstruction, environmental color and lighting analysis, or other suitable operations. For instance, optical sensor information and the position sensor information may be used by the head mounted computing device 10 to identify surfaces in the real-world environment perceived by the optical sensor. As some particular examples, a surface of a wall, ceiling, floor, or object, etc., may be identified by the head mounted computing device 10. Additionally, optical and position sensor information may be used to create a virtual model of the real-world background to enable a virtual object to be generated at desired locations in the real-world environment, for instance.

FIG. 2 shows a portable computing device 200. Specifically, a tablet type computing device is illustrated in FIG. 2. However, numerous types of portable computing devices have been contemplated such as smartphones, laptops, etc.

The portable computing device 200 includes a display 202 configured to present graphical content within a user interface 203. The display 202 may be a touch sensitive display, in one example. Thus, the display may be configured to receive touch-inputs (e.g., multi-touch inputs) such as drawing inputs, gestural inputs, etc.

The portable computing device 200 further includes cameras 204 configured to capture images and video of the surrounding environment. Both a front and rear facing camera are depicted in FIG. 2. However in other examples the device may only include a single camera, such as the rear facing camera. In this way, a user can view the display while images/video of the real-world environment in a direction extending through the display can be captured.

The portable computing device 200 may be configured to present 3-dimensional environments on the display 202. Specifically, the portable computing device 200 may be configured to present a virtual reality environment and/or an augmented reality environment on the display 202. A virtual reality environment may include a graphical environment made up of virtual surfaces, objects, backgrounds, etc. An augmented reality environment may include a 3-dimensional environment which blends real-world elements captured by the camera of the device with virtual elements layered over the image captured by the camera. For instance, an augmented reality environment may include video of a real-world scene captured via the cameras 204 as well a virtual object rendered in the real-world scene to provide an enhanced viewing environment that can be manipulated by the user.

The portable computing device 200 may also include additional elements such as buttons 206 and/or other suitable input devices such as a keyboard, trackpad, touch sensors, etc., enabling the user to perform various inputs and interact with the virtual reality environment and/or the augmented reality environment. Additionally, optical sensing via the cameras 204 may be used to detect gesture input used to interact with the aforementioned environments.

Figure 3:
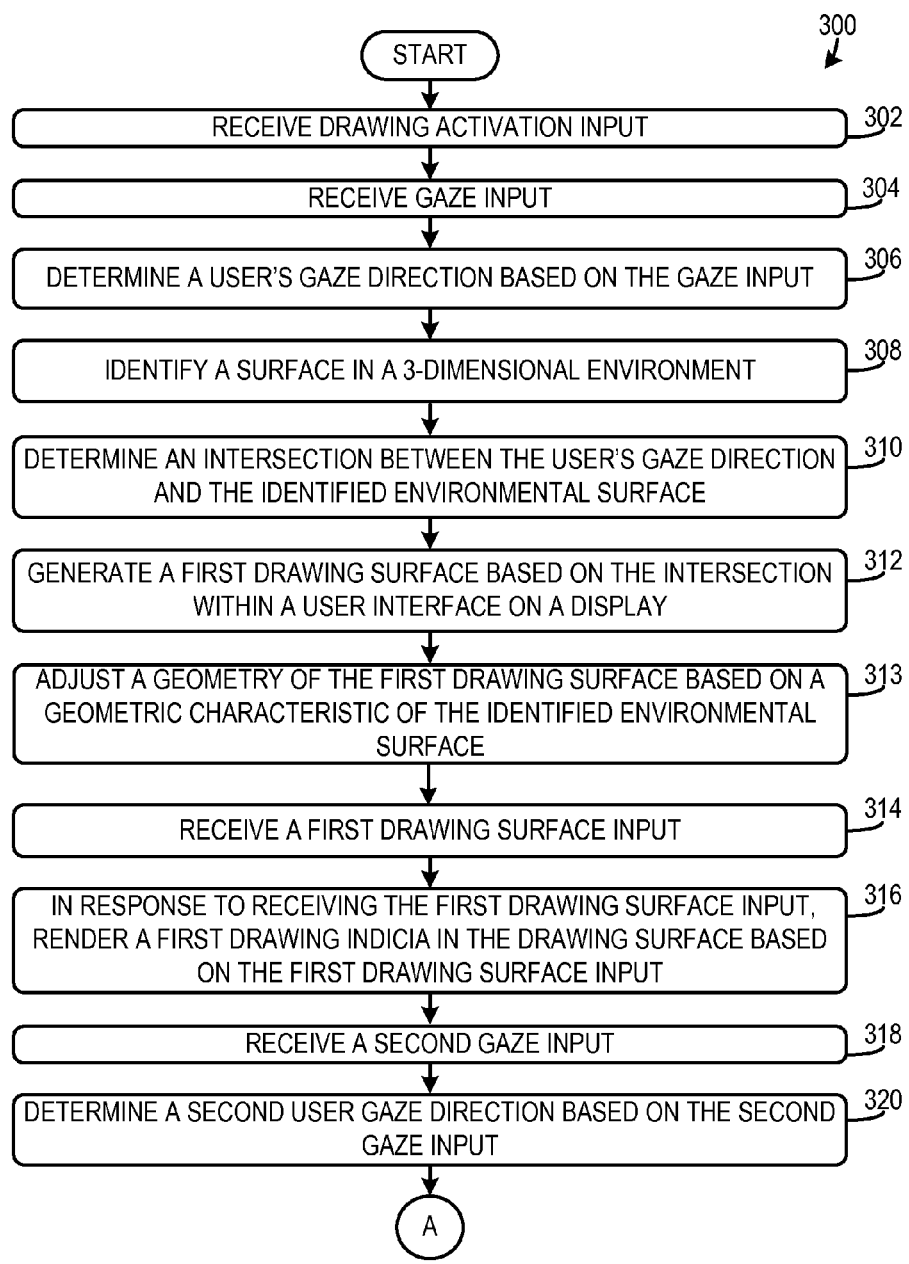
FIG. 3-4 shows a method for operating a computing device according to an embodiment of the present disclosure.

FIG. 3 shows a method 300 for operation of a computing device. The method 300 may be implemented via the computing device described herein with regard to FIGS. 1 and 2 or may be implemented via other suitable computing devices. The method 300 generates drawing surfaces based on a user's gaze direction to enable a user to intuitively mark-up a virtual or augmented reality environment. In this way, a user can be provided with an enriched interactive experience that enables intuitive conveyance of ideas in a 3-dimensional space.

At 302 the method includes receiving a drawing activation input from the user, which instructs the system to spawn a drawing surface upon which the user may start drawing annotations. One example drawing activation input may be a pinch gesture in which the relative position between the tips of two or more of a user's fingers in a user's hand are decreased. It will be appreciated that gestural inputs such as the pinch gesture may be sensed via the optical sensor system 14, described above with regard to FIG. 1, which may include a depth camera in additional to an RGB camera. Alternatively, when the method is implemented using a tablet computer or smartphone device, the gestural inputs may be sensed by a touch screen. Numerous other drawing activation inputs have been contemplated, such as other inputs keyboards, computer mice, keypads, trackpads, etc., as well as other types of gestural inputs detected by cameras or touch screens. Thus it will be appreciated that not only three dimensional gesture commands made in 3-dimensional space and multi-touch gesture commands on a touch screen, but also keyboard commands and mouse commands, may be used as drawings activation inputs.

Next at 304 the method includes receiving a gaze input. The gaze input may be an input from a camera sensor that captures and recognizes features in a user's face (e.g., eyes, nose, etc.). Thus, as one example, the gaze input could include the positions of reference points within the user's eyes such as the pupils, glints, etc., at a point in time. An interpupillary distance may also be detected and included as a gaze input in order to calibrate the display of holograms to the user based on the gaze input. The gaze input may additionally or alternatively include an input from an orientation sensor in the computing device that indicates the orientation of the user's head. In addition or in the alternative, the gaze input may include active user input identifying a point in the 3-dimensional environment. The active user input may be generated via suitable input device such as touch sensors, optical sensors, a mouse, a keyboard, etc. The active user input, for example, may be a user pointing at an object in the 3-dimensional environment, selecting an object location on a touch screen depicting the 3-dimensional environment, or speaking an identified object's name, for example.

At 306 the method includes determining a user's gaze direction based on the gaze input. For instance, the orientation of a user's eyes may be inferred (i.e., calculated) from images captured via the optical sensor system 14, described above. The user's eye orientation may be correlated to a user's gaze direction. It will be appreciated that the user's gaze direction may be expressed via two points that define a line (an origin point and one other point on the line), as well as a direction. Thus, the gaze direction may be expressed as a ray. Accordingly, the user's gaze direction may be visually displayed as a line having a predetermined thickness, which extends from a point on the user's face to the intersection of the gaze direction and a surface as describe below. In yet another example, a line extending from a point on a user's face to a user-selected point in the 3-dimensional environment may be used to indicate the user's gaze direction. The point on the user's face may be determined based on an orientation sensor input, such as an gyroscope and accelerometer in an inertial measurement unit, and the user-selected point in the environment may be selected by touching a location on a touchscreen corresponding to the point in the 3-dimensional environment, when viewing the 3-dimensional environment on a touchscreen enabled device.

At 308 the method includes identifying a surface in a 3-dimensional environment. The 3-dimensional environment may be real-world 3-dimensional environment or a virtual reality 3-dimensional environment. It will be appreciated that the real-world environment is the environment external to the device and therefore may be captured by a camera, for instance. In such an example, the real-world environment may be the field of vision as viewed through the see-through holographic display by the user. Further in one example, the 3-dimensional environment may be supplied from another computing device or service.

At 310 the method includes determining an intersection between the user's gaze direction and the identified environmental surface. The intersection may be expressed as coordinates or other position indicators in the 3-dimensional space. In some instances the intersection may be the actual point of intersection, while in other implementations, the intersection may be a region of intersection adjacent the actual point of intersection.

At 312 the method includes generating a first drawing surface based on the intersection within a user interface on a display. In this way, an intuitive surface can be provided in the 3-dimensional environment that enables a user to quickly and precisely draw in the environment. A variety of drawing surface geometries have been contemplated. For instance, the drawing surface is typically a continuous surface, and may be absent of sharp corners or other discontinuities. In one specific example, the first drawing surface may be planar. Using a continuous and planar surface enables a user to easily mark-up intended portions of the 3-dimensional environment in an intuitive manner. However, in other examples the first drawing surface may be curved in a convex or concave manner.

In yet another example, at least a portion of the first drawing surface may be highlighted with a border that is visually distinguishable from the remainder of the drawing surface, to indicate the boundary of the surface to the user, while the remainder of the drawing surface is transparent or translucent. Still further in other examples the entire surface may be transparent or translucent.

Furthermore, the first drawing surface may be generated within a predetermined distance from the intersection of the user's gaze direction and the identified environmental surface. For example, the first drawing surface may be positioned spaced apart and toward the users a predetermined distance such as 5-10 millimeters toward the user, along the axis of the gaze direction, from the intersection of the gaze direction and the identified environmental surface. Such a positioning enables the drawing on the first drawing surface to be displayed in front of the identified environmental surface, to ensure the drawing is visible to the user. In another example, the drawing surface may be spaced apart in a direction other than along the axis of the gaze direction, such as spaced apart 5-10 millimeters, or more, from the intersection. For example, when a region of intersection is identified that encompasses a planar object in the three dimensional environment, the drawing surface may be spawned in the location of the planar object, even if the actual point of intersection of the user's gaze direction is spaced apart a distance from the planar object. Thus, for example, if a user is looking at a point that is slightly to the left of a whiteboard in a meeting room, a drawing plane may be generated on the whiteboard based on the system's knowledge that whiteboards often receive holographic annotations, and the proximity of the user's gaze direction. Specifically, in another example, the first drawing surface may be positioned at the intersection. In each of these examples, the drawing surface is said to be spatially associated with the intersection.

Additionally, the first drawing surface may be arranged at a predetermined angle relative to the user's gaze direction. For instance, the first drawing surface may be arranged at a 90 degree angle with regard to the user's gaze direction, such that the first drawing surface is normal to the gaze direction of the user. In this way, the user can be provided with a drawing surface which is arranged at an orientation that is easy to see and to draw on due to the lack of variation in surface depth perspective. As another example, the predetermined angle may be other than 90 degrees. For example, the first drawing surface may be oriented to be normal to an angle that bisects the gaze direction of the user and the gaze direction of another user, in order to make the surface easier to see for both the user and the other user interacting with the augmented reality environment. However, annotating a surface that is too oblique relative to the gaze direction could present challenges to the user, so an orientation of the first drawing surface that is 60-90 degrees relative to the gaze direction is typically adopted. Further, in some examples, the initial arrangement of the drawing surface may be sustained after a change in the user's gaze direction. In this manner, the user may spawn a drawing surface while gazing in a first direction, and make annotations on that first drawing surface, and then change the gaze direction and/or walk around, yet still annotate on the same drawing surface having the same orientation. This helps ensure consistency in the user's interaction with the drawing surface.

Additionally, the position of the first drawing surface relative to the user's gaze direction may be adjusted based on the geometry of the identified environmental surface. For instance, the surface may be snapped to a plane or point on the environmental surface. Typically, this is performed if the surface is within a predetermined angle or distance from the environmental surface, such as between 0-5 degrees of the surface, or between 0-5 millimeters of the surface. In this manner, if the user spawns a drawing surface that is close to being planar with a wall in the environment, but slightly off axis, the head mounted computing device may snap the spawned drawing surface to be planar with the wall, since such small misalignments between holograms and the real environment can be easily perceived by the user and may be jarring to the user experience.

At 313 the method may include adjusting a geometry of the first drawing surface based on a geometric characteristic of the identified environmental surface. The geometric characteristic of the environmental surface may be a surface shape, size, curvature, etc. For instance, the environmental surface may be a column and the drawing surface may be spawned with an amount of curvature that corresponds to the curvature of the column. Still further in another example, the environmental surface may be adjacent to a corner in a room and the drawing surface may be curved to fit into the corner. In both of these examples, curve fitting algorithms are used to fit a curved drawing surface onto a curved or polygonal environmental surface. As another example, the drawing surface may be spawned on an environmental surface such as a top of a counter, desk or table, which is a plane of finite dimensions, and the drawing surface may be spawned over the environmental surface with a perimeter that is programmatically sized to be coextensive with the environmental surface.

At 314 the method includes receiving a first drawing surface input from the user. The first drawing surface input may be a gestural input, a touch input, a mouse input, etc., via which the user may draw annotations on the drawing surface. For instance, a user viewing the drawing surface as hologram displayed in an augmented reality environment may move a finger or holographic representation of a finger of a hand in a desired manner within or along the drawing surface, to thereby effect drawing surface input. Therefore it will be appreciated that the first drawing surface input may be implemented within or proximate to the drawing surface, as viewed by the user. In other embodiments, user interface commands may be provided to the user to enable the user to input the first drawings surface input when the user is physically standing at a distance from the hologram of the drawing surface and cannot reach it. Further in another example, the drawing activation input and the first drawing surface input may be jointly implemented as a continuous input. For instance, the drawing activation input may be the placement of a user's finger on a touch pad (or hologram) and the drawing surface input may be the movement of the user's finger around the touch pad (or hologram). However, numerous types of inputs have been contemplated which may not be continuously implemented.

At 316 the method includes, in response to receiving the first drawing surface input, rendering a first drawing indicia in the drawing surface based on the first drawing surface input. The first drawing indicia may include one or more lines, shapes, etc. The drawing indicia may correspond to the path of the first drawing surface input, in one example. For instance, the drawing indicia may be a line related to (e.g., that traces) the path of a user's finger-tip. However, other types of drawing indicia may be generated. For instance, predetermined shapes, objects, etc., may be generated in response to the first drawing surface input.

At 318 the method includes receiving a second gaze input and at 320 the method includes determining a second user gaze direction based on the second gaze input. These steps follow similar processes as described above in relation to determining a first gaze input at 304 and determining a first gaze direction at 306.

Figure 4:
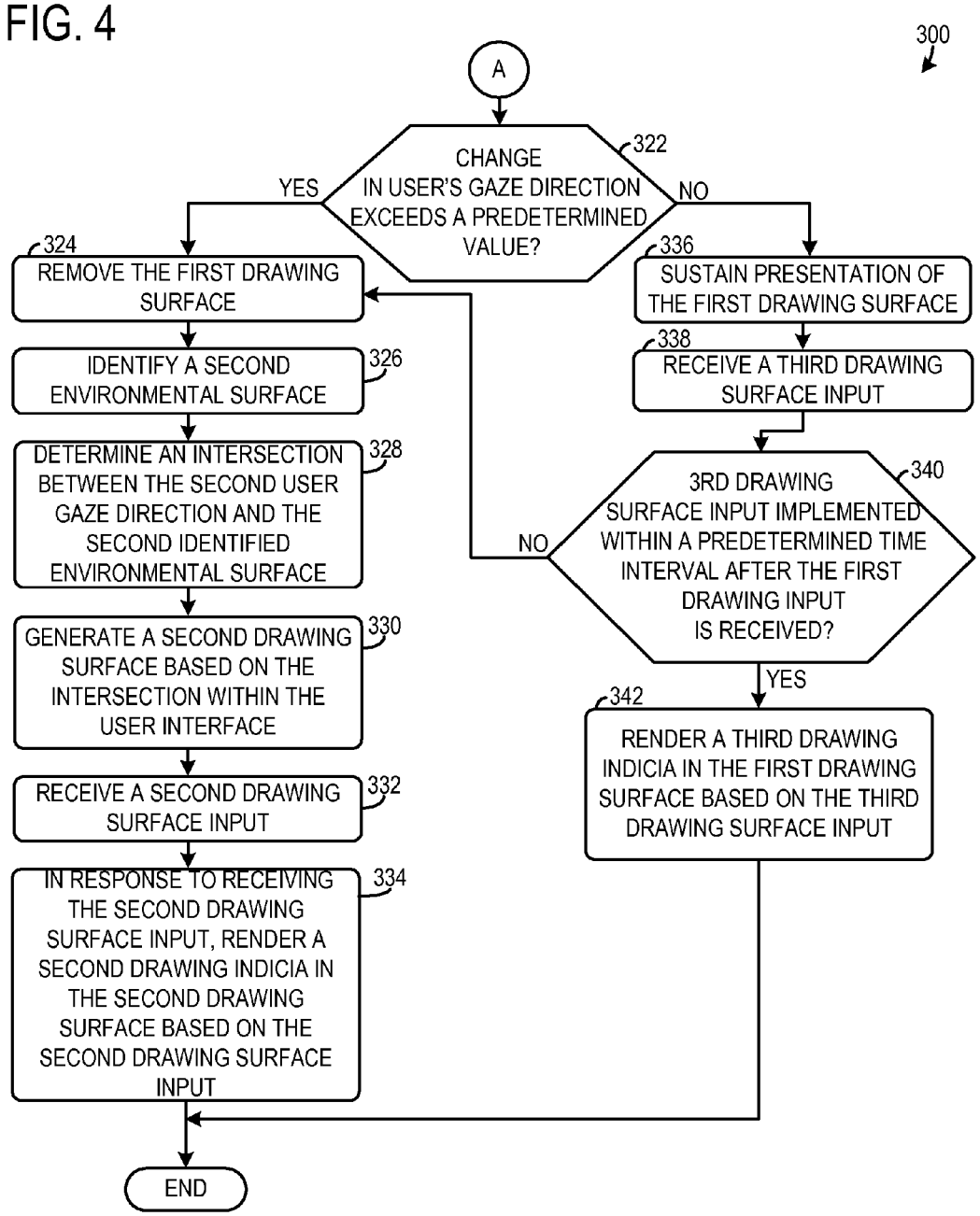

Now referring to FIG. 4, at 322 the method determines if a change in the user's gaze direction exceeds a predetermined value. The change in the user's gaze direction may be expressed by the distance between the surface intersection points in the 3-dimensional environment, in one example. In another example, the change in the user gaze direction may be the difference between the first user gaze direction and the second user gaze direction. This may be computed by expressing the first and second user gaze directions as vectors, and subtracting them to find the magnitude of the difference vector, for instance. As another example, the absolute distance between the intersection of the user's gaze direction and the surfaces in the 3-dimensional environment may be used to determine if the change in the user's gaze direction exceeds a predetermined value. In some examples step 322 may be omitted from the method.

If it is determined that the change in the user's gaze direction exceeds the predetermined value (YES at 322) the method advances to 324. In some implementations, the method only proceeds to 324 if the predetermined value is exceeded for a predetermined period of time. At 324 the method includes removing the first drawing surface. Additionally or alternatively, the first drawing surface may be removed in response to receiving an express drawing surface removal input from the user, such as a removal gesture or speech command. In this manner it will be appreciated that the method keeps the drawing surface displayed for so long as the user is deemed to be interacting with the drawing surface, with the proxy by which the system determines that the user intends to continue to interact with the drawing surface being a sudden change in gaze direction that is above threshold, or that is above a threshold for above a predetermined period of time. Thus, if a user turns away from a virtual drawing surface spawned on a whiteboard in a classroom to face the class and answer a question, the drawing surface may disappear, or if the user's gaze drifts for long enough away from the drawing surface, then the drawing surface may disappear.

Next, at 326 the method includes identifying a second environmental surface in the 3-dimensional environment. At 328 the method includes determining an intersection between the second user gaze direction and the second identified environmental surface. Similar processes are used at 326 and 328 as are described above in relation to steps 308 and 310.

At 330 the method includes generating a second drawing surface based on the intersection determined at step 328 within the user interface. In this way multiple surfaces may be generated in the 3-dimensional environment to enable mark-up in desired environmental regions. Similar processes are used to generate the second drawing surface as are used to generate the first drawing surface at 312 above.

Next, at 332 the method includes receiving a second drawing surface input, which may be a user's gesture input or other similar input similar to that described above in step 314.

At 334 the method includes in response to receiving the second drawing surface input, rendering a second drawing indicia in the second drawing surface based on the second drawing surface input, similar to the manner in which the first drawing indicia is rendered at 316.

However, if it is determined that the change in the user's gaze direction does not exceed the predetermined value (NO at 322) the method proceeds to 336. At 336 the method includes sustaining presentation of the first drawing surface. In this way, small unintended movements of the user's gaze would not trigger spawning of a second drawing surface. In the example given above, a user who glanced away from the drawing surface spawned on the whiteboard a short distance and/or for a short amount of time, would not undesirably find that the drawing surface disappears.

In some cases, it may be desirable to render future drawings inputs by a user on the same virtual drawing surface, when those drawing inputs are sufficiently spaced closely in time that the system can infer that the user intends for the drawing inputs to be made on the same drawing surface. To achieve this goal, at 338 the method includes receiving a third drawing surface input, and at 340 the method includes determining if the third drawing surface input is implemented within a predetermined time interval after the first drawing input is received.

If it is determined that the third drawing surface input is not implemented within the predetermined time interval after the first drawing input is received (NO at 340) the method returns to 324 and proceeds with removing the first drawings surface and spawning a new drawing surface based on a newly detected gaze direction. However, when the NO branch is followed from 340 to 324, the method proceeds by performing steps 326-330, skipping step 332, and rendering at step 334 the second drawing indicia based on the third drawing input that was received at 340. In this manner the third drawing indicia may be displayed on the newly spawned drawing surface based on the new direction of the user's gaze.

However, if it is determined that the third drawing surface input is implemented within the predetermined time interval after the first drawing input is received (YES at 340) the method proceeds to 342. At 342 the method includes rendering a third drawing indicia in the first drawing surface based on the third drawing surface input.

Figure 5:
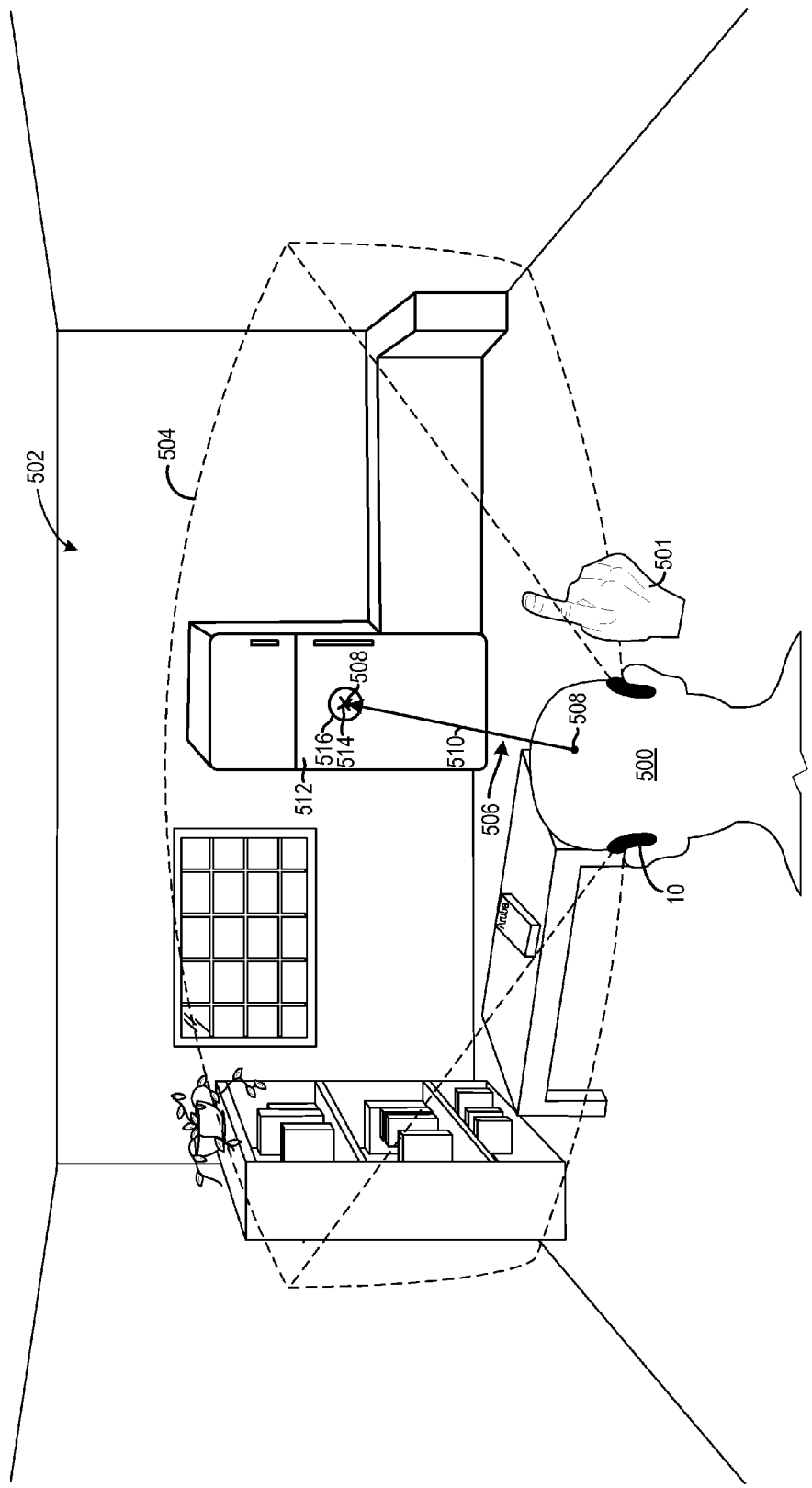
FIG. 5-8 show an exemplary use case scenario for generating drawing surfaces based on a user's gaze direction.
Figure 6:
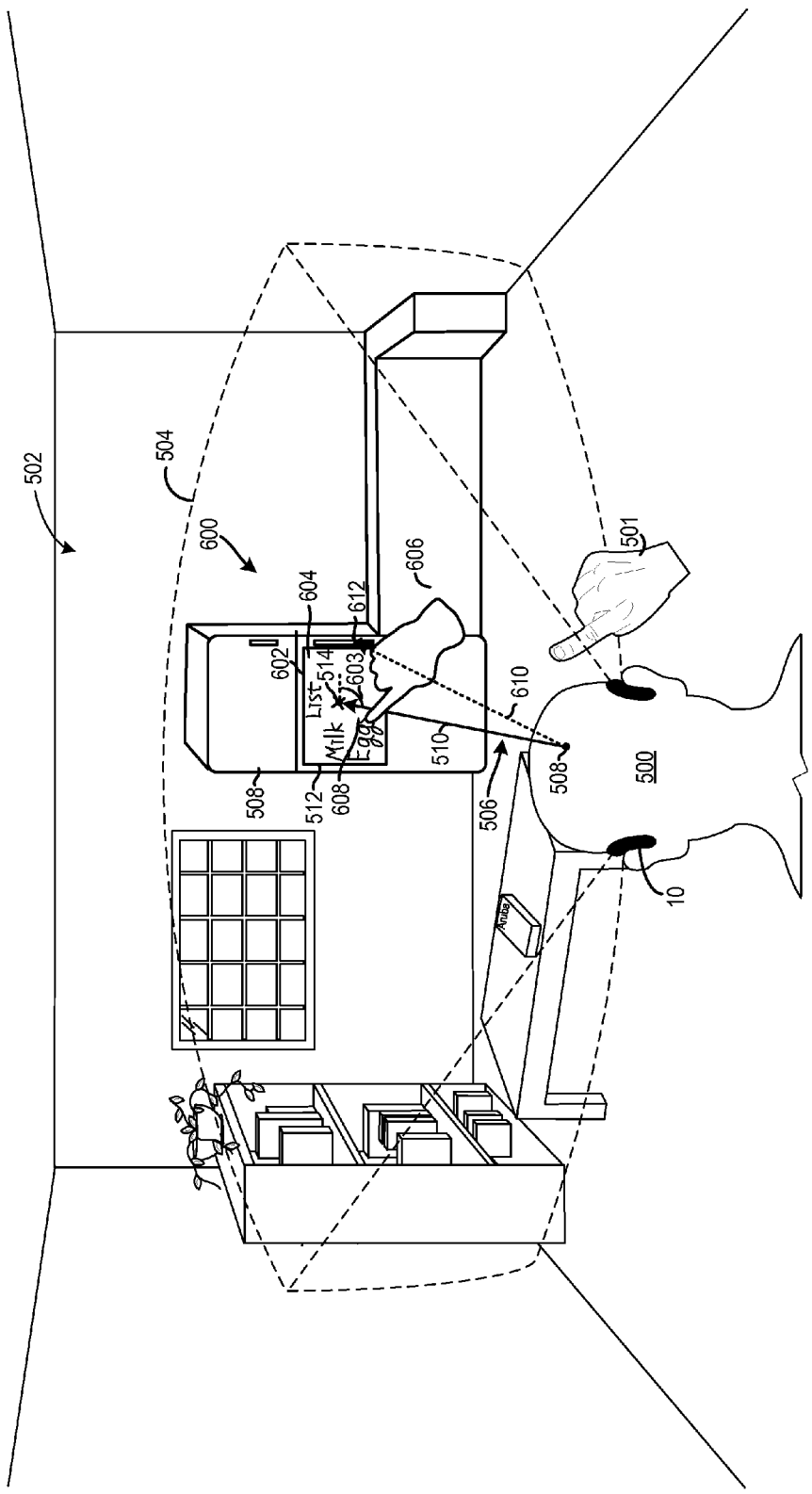
Figure 7:
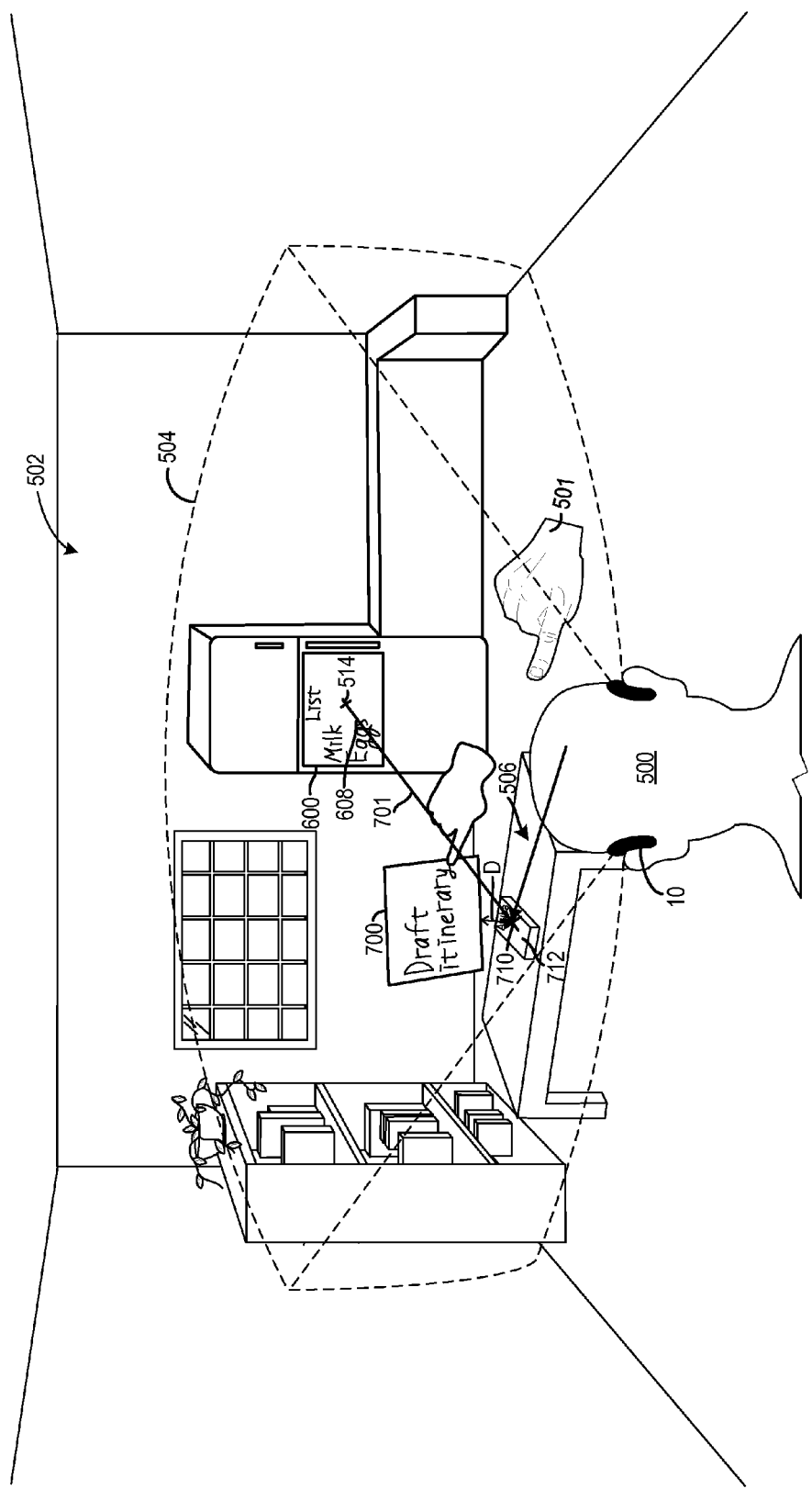

FIGS. 5-8 show an exemplary use case scenario in which drawing surfaces are spawned in a 3-dimensional augmented reality environment. It will be appreciated that FIGS. 5-8 illustrate sequential input scenarios. FIGS. 5-8 each show a user 500 wearing the head mounted computing device 10 in a 3-dimensional environment 502, gesturing with a hand 501. The 3-dimensional environment is a real-world environment that is visible to the user though the see-through display of the head mounted computing device 10. However, other types of 3-dimensional environments, such as virtual environments may be used, in other examples. A field of view 504 is also indicated in FIGS. 5-7. The field of view 504 indicates a region where the head mounted computing device 10 can project holographic images, such as drawing indicia. It will be appreciated that the field of view or a smaller region in the field of view may be used to display a user interface in which holographic images can be displayed.

FIG. 5 shows a user's gaze direction 506. As previously discussed, the user's gaze direction 506 may be determined based on a gaze input. As shown, the user's gaze direction may be defined by two points 508 that define a line 510. Furthermore, the line 510 may have a predetermined thickness. In this way, a user's focus region in the 3-dimensional environment can be inferred. However, other ways of representing the direction of a user's gaze have been contemplated.

An environmental surface 512 can be identified by the head mounted computing device 10. As shown, the environmental surface is a door of a refrigerator. However, any conceivable type of environmental surface may be identified by the head mounted computing device 10.

Additionally, an intersection 514 between the user's gaze direction 506 and the environmental surface 512 may also be determined via the head mounted computing device 10. An intersection region 516 surrounding the intersection 514 may also be identified by the head mounted computing device 10. The intersection region 516 may be used for subsequent drawing surface spawning.

FIG. 6 shows a first drawing surface 600 that is generated based on the intersection 514 between the user's gaze direction 506 and the environmental surface 512. Specifically in the depicted example, the first drawing surface 600 is spawned at the intersection 514. However in other examples the first drawing surface 600 may be spawned at a predetermined distance from the intersection 514. For instance, if the user's gaze direction pointed to a book on a table, as shown in FIG. 7, the drawing surface may be spawned a predetermined distance D above the book. This type of surface location adjustment may be implemented when the user's gaze direction points to an undesirable surface spawning location. For example, the environmental surface may have an irregular geometry or have a surface area less than a predetermined value, indicating an undesirable spawning location. In this way, spawning of drawing surfaces in undesirable locations can be avoided to improve drawing input. In the example of the book on the table, if the drawing surface was spawned centered on the intersection of the user's gaze direction with the book, the drawing surface would extend downward and bisect the table, which would be visually jarring to the user. Accordingly, the method may identify the potential collision of the drawing surface with surrounding recognized objects such as the table, and position the drawing surface the predetermined distance away from the intersection so as to avoid such collisions.

The first drawing surface 600 may be visually represented via holographic images. As illustrated in FIG. 5, the boundary 602 as well as the interior region 604 of the first drawing surface 600 may be indicated. However, in other examples the drawing surface may not be visually represented or only selected portions of the drawing surface may be visually represented, such as the drawing surface boundary or a portion of the boundary. In yet another example, the first drawing surface 600 may only be visually represented in response to user input. In such an example, a wave or other predetermined animation may travel across the drawing surface in response to a user performing an input on or adjacent to the drawing surface. In such an example, the wave may propagate to the boundary of the drawing surface. This type of animation may also be launched subsequent to generation of the drawing surface. In this way, a user can be provided with visual cues indicating the location of the drawing surface.

The first drawing surface 600 may be rendered at a predetermined angle 603 with regard to the user's gaze direction 506. Specifically, in one example the first drawing surface 600 may be rendered at a perpendicular angle with regard to the user's gaze direction 506. However, other angles may be used in other examples. For instance, the first drawing surface may be rendered at an angle of between 60-90 degrees relative to the user's gaze direction. This angle may be selected, for example, to accommodate viewing by other people present in the 3-dimensional environment.

The first drawing surface 600 is illustrated as a continuous planar surface. However, numerous surface geometries have been contemplated. For instance, a convex, concave, parabolic, etc., drawing surface may be used, in other examples.

After the first drawing surface 600 is spawned the drawing surface is configured to receive drawing surface inputs and render drawing indicia in response to receiving the drawing surface input. Numerous types of user inputs such as touch inputs, gestural inputs, mouse inputs, keyboard inputs, touch pad inputs, etc., have been contemplated.

The user's hand 501 may implement a drawing gesture. In the depicted example, a holographic representation of the user's hand 606 is presented on the display of the head mounted computing device 10. This enables a user to reach distant surfaces in the 3-dimensional environment via gestural input. However, as discussed above numerous drawing surface inputs are possible. For instance, the drawing surface may accept inputs from a keyboard, a mouse, a touchpad, etc.

The drawing gesture may be implemented within the first drawing surface 600, as viewed by the user. However in other examples, the drawing gesture may be implemented adjacent to the first drawing surface 600, as viewed by the user. It will be appreciated that the drawing gesture may be sensed by the head mounted computing device 10 and a drawing surface input may be generated in response to sensing the drawing gesture. In this way, a drawing surface input may be received by the computing device.

In response to receiving the drawing surface input a drawing indicia 608 may be rendered based on the drawing surface input. In the depicted example, the drawing indicia 608 denotes the path of the drawing surface input 606. However, other drawing indicia rendering techniques have been contemplated. As shown, the drawing indicia 608 are a shopping list pertaining to food items the user desires to purchase, some of which may be placed in the refrigerator. In this way, drawing indicia can be generated which are related to objects in the 3-dimensional environment. As a result, a user can enhance the augmented reality environment with useful information conveyed via the drawing indicia. Of course, this is but one example, and numerous types of drawing indicia apart from shopping list items have been contemplated.

Dashed line 610 indicates a possible change in the user's gaze direction. An intersection 612 between another environmental surface and the altered user's gaze direction 610. For instance, the user's gaze direction may be directed to the handle of the refrigerator adjacent to the intersection 514. As previously discussed a small change in the user's gaze direction may not necessitate spawning of another drawing surface. Therefore, when the change in the user's gaze direction is less than a predetermined amount, spawning of another drawing surface may be inhibited. The changes in the user's gaze direction may be expressed as the distance between the points of intersection (i.e., 514 and 612) in the 3-dimensional environment 502.

FIG. 7 shows a scenario where the user's gaze direction 506 is altered which triggers generation of another drawing surface. It will be appreciated that the gaze direction may change when the user's eyes and/or head shift in orientation.

As shown in FIG. 7, presentation of the first drawing surface 600 and the drawing indicia 608 are sustained. However, it will be appreciated that the first drawing surface 600 may be removed from the display after a predetermined time interval has surpassed, in other examples. For instance, the first drawing surface 600 may be removed from the display 30 second, 1 minute, or 5 minutes after the surface is spawned. Still further in other examples, the first drawing surface 600 may be removed from the display in response to the user's gaze direction 506 changing by a predetermined value. For instance, if a distance 701 between the points of intersection (514 and 710) between a user's initial gaze direction and subsequent gaze direction is greater than a threshold value, the first drawing surface 600 may be removed from the display. However, presentation of the first drawing surface 600 may be sustained regardless of the change in the user's gaze direction, in some examples. In yet another example, the first drawing surface 600 may be removed from the display in response to receiving a drawing surface removal input. In this way, a user can efficiently manage presentation of the drawing surfaces.

FIG. 7 also shows presentation of a second drawing surface 700. The second drawing surface 700 is displayed in response to the user's gaze direction 506 changing by a predetermined value. As previously discussed the second drawing surface may be spawned based on an intersection 710 between the user's gaze direction 506 and an environmental surface 712.

As shown, the user's hand 501 implements a drawing gesture that triggers reception of a drawing surface input at the head mounted computing device 10. The drawing gesture as viewed by the user may be implemented within the second drawing surface 700. However in other examples, the drawing gesture as viewed by the user may be implemented adjacent to the second drawing surface.

In response to receiving the drawing surface input a drawing indicia 706 may be rendered by the head mounted computing device 10 based on the drawing surface input. In the depicted example, the drawing indicia 706 trace the path of a finger of the user's hand 501. However, other drawing indicia rendering techniques have been contemplated. As shown, the drawing indicia are instructions related to a travel book on a coffee table. For instance, the instructions may be conveyed to other users that are also viewing the augmented reality environment, either contemporaneously or at a later point in time. In this way collaborative drawing content can be provided to multiple users in the augmented reality 3-dimensional environment. Of course, the note relating to the travel book is merely exemplary, and numerous types of other drawing indicia may be generated in other examples.

Figure 8:
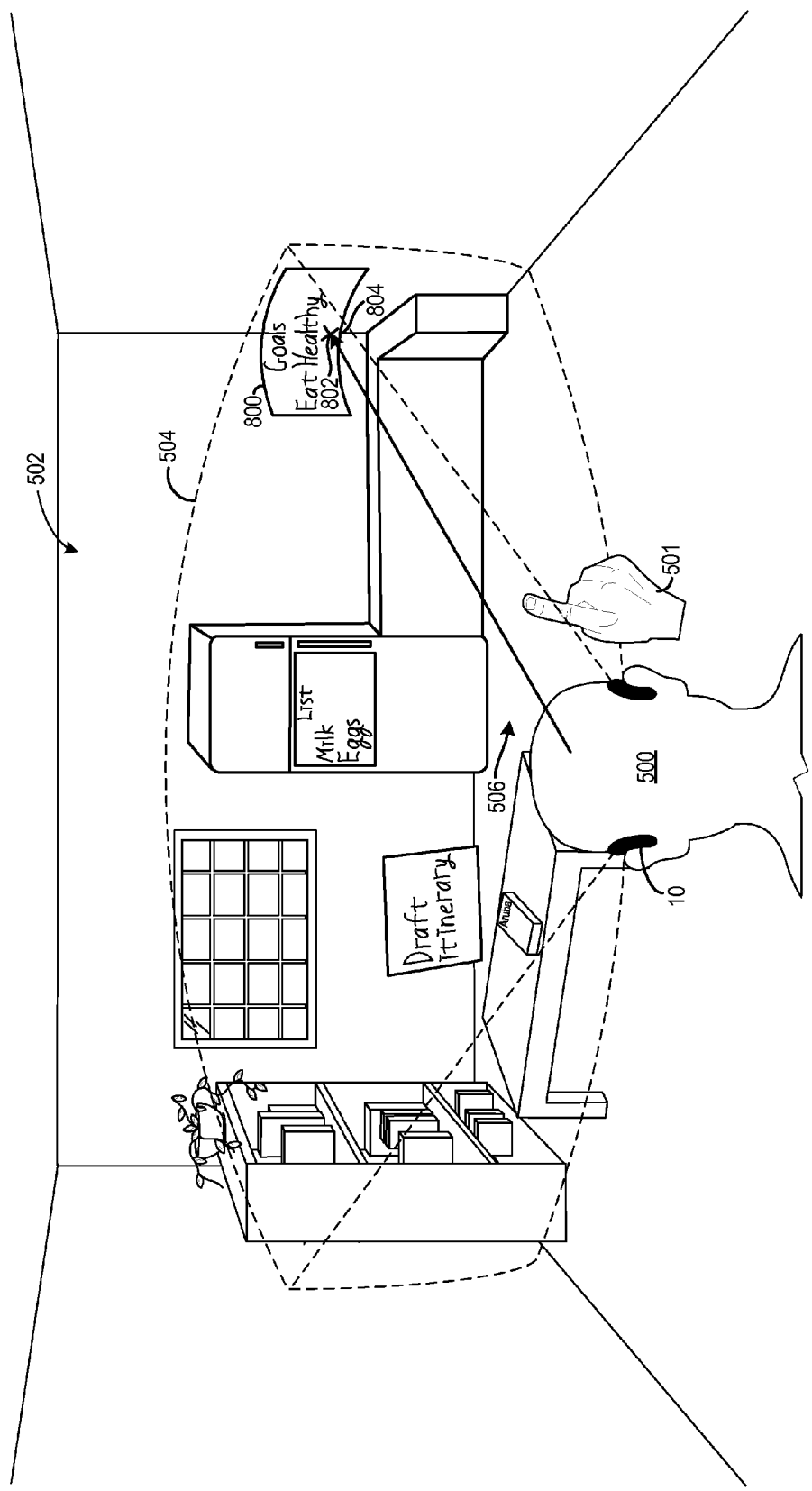

FIG. 8 shows a scenario where the user's gaze direction 506 changes for a second time. A drawing surface 800 is spawned at an intersection 802 between the user's gaze direction 506 and an environmental surface 804. The shape of the drawing surface 800 conforms to the geometry of the environmental surface. For example, the environmental surface in the vicinity of the drawing surface 800 is the corner of a room, and therefore the drawing surface is curved to fit into the corner. In this way, the geometry of the drawing surface can be adjusted based on the constraints of the 3-dimensional environment, efficiently utilizing available space. However, other types of drawing surface geometry adjustments have been contemplated. For instance, a convex drawing surface may be spawned adjacent to an architectural column, in one example.

Although the use case scenario shown in FIGS. 5-8 is illustrated with regard to the head mounted computing device 10, it will be appreciated that the portable computing device 200 may also exhibit similar functionality to that which is described with regard to FIGS. 5-8.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
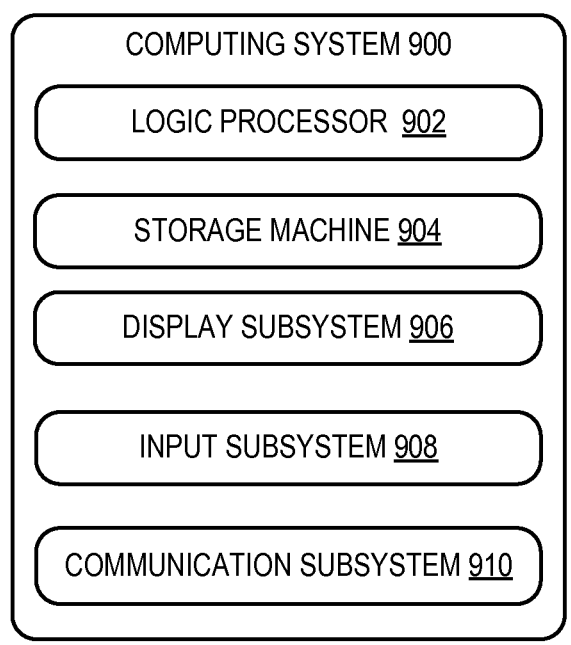
FIG. 9 shows a schematic depiction of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold or store instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In another example a method for operating a computing device is provided. The method includes determining a user's gaze direction based on a gaze input, determining an intersection between the user's gaze direction and an identified environmental surface in a 3-dimensional environment, generating a first drawing surface based on the intersection within a user interface on a display, receiving a first drawing surface input, and in response to receiving the first drawing surface input, rendering a first drawing indicia on the first drawing surface based on the first drawing surface input. In such an example, the drawing surface may be generated within a predetermined distance from the intersection. Additionally in such an example, the 3-dimensional environment may be a real-world 3-dimensional environment external to the computing device and where the computing device may be a head mounted computing device and the display is a see-through holographic display configured to present holographic images. In such an example, the computing device may be a portable computing device comprising a camera configured to capture the 3-dimensional environment of the real-world external to the portable computing device and a display configured to present the 3-dimensional environment. In such an example, the method may further include receiving a drawing activation input and where the user's gaze direction is determined in response to receiving the drawing activation input. In such an example, the method may further include determining a change in the user's gaze direction, receiving a second drawing surface input, and if change in the user's gaze direction does not exceed a predetermined value, rendering a second drawing indicia on the first drawing surface based on the second drawing surface input.

In such an example, the method may further include if the change in the user's gaze direction exceeds the predetermined value, generating a second drawing surface based on an intersection between the second gaze direction and a second surface within the user interface and rendering the second drawing indicia on the second drawing surface based on the second drawing surface input.

In such an example, the step of rendering the second drawing indicia may only implemented when the second drawing surface input is received within a predetermined time interval after the first drawing surface input is received. In such an example, at least a portion of the first drawing surface may be highlighted. In such an example, the first drawing surface may be planar.

In such an example the method may further comprise adjusting a geometry of the first drawing surface based on a geometric characteristic of the identified environmental surface. In such an example the method may further comprise removing the first drawing surface from the user interface after a predetermined time interval has been surpassed subsequent to generation of the first drawing surface.

In such an example the method may further comprise removing the drawing surface from the display in response to a change in the user's gaze direction exceeding a predetermined value. In such an example, the drawing surface may be arranged at a predetermined angle relative to the user's gaze direction. In such an example, the user's gaze direction may be visually displayed as a line having a predetermined thickness.

In another example, a computing device is provided. The computing device includes a display configured to present a user interface, instructions stored in memory executable by a processor to: determine a user's gaze direction based on a gaze input, identify an environmental surface in a 3-dimensional environment, determine an intersection between the user's gaze direction and the environmental surface, generate a first drawing surface based on the intersection within a user interface on a display, and render a first drawing indicia in the drawing surface responsive to receiving a first drawing surface input and based on the first drawing surface input. In such an example, the display may be a see-through holographic display configured to present holographic images in the 3-dimensional environment and the computing device is a head mounted computing device. In such an example, the drawing surface may be arranged at a predetermined angle relative to the user's gaze direction and the first drawing surface is planar.

In another example, a method for operating a head mounted computing device is provided. The method includes receiving a drawing activation input, generating a user's gaze direction in response to receiving the drawing activation input and based on a gaze input, determining an intersection between the user's gaze direction and an identified environmental surface in a 3-dimensional environment, generating a drawing surface based on the intersection within a user interface on a display, receiving a drawing surface input, and in response to receiving the drawing surface input, rendering a drawing indicia on the drawing surface based on the drawing surface input. In such an example, drawing activation input and the drawing surface input may be jointly implemented as a continuous input.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for operating a head mounted computing device, the method comprising:
   determining a user's gaze direction based on a gaze input;
   determining an intersection between the user's gaze direction and an identified environmental surface in a real-world 3-dimensional environment;
   generating a first drawing surface based on the intersection within a user interface on a see-through holographic display configured to present holographic images, wherein the first drawing surface is arranged at a predetermined angle relative to the user's gaze direction, wherein the predetermined angle is determined at least in part based on a characteristic of the 3-dimensional environment;
   receiving a first drawing surface input that includes a path drawn by a user; and
   in response to receiving the first drawing surface input, rendering a first drawing indicia on the first drawing surface within the user interface on the display that includes one or more lines that denote the path drawn by the user based on the first drawing surface input.

2. The method of claim 1, where the drawing surface is generated within a predetermined distance from the intersection.

3. The method of claim 1, where the computing device is a portable computing device comprising a camera configured to capture the 3-dimensional environment of the real-world external to the portable computing device and a display configured to present the 3-dimensional environment.

4. The method of claim 1, further comprising receiving a drawing activation input and where the user's gaze direction is determined in response to receiving the drawing activation input.

5. The method of claim 1, further comprising:
   determining a change in the user's gaze direction;
   receiving a second drawing surface input; and
   if change in the user's gaze direction does not exceed a predetermined value, rendering a second drawing indicia on the first drawing surface based on the second drawing surface input.

6. The method of claim 5, further comprising:
   if the change in the user's gaze direction exceeds the predetermined value, generating a second drawing surface based on an intersection between the second gaze direction and a second surface within the user interface; and rendering the second drawing indicia on the second drawing surface based on the second drawing surface input.

7. The method of claim 5, where the step of rendering the second drawing indicia is only implemented when the second drawing surface input is received within a predetermined time interval after the first drawing surface input is received.

8. The method of claim 1, where at least a portion of the first drawing surface is highlighted.

9. The method of claim 1, where the first drawing surface is planar.

10. The method of claim 1, further comprising adjusting a geometry of the first drawing surface based on a geometric characteristic of the identified environmental surface.

11. The method of claim 1, further comprising removing the first drawing surface from the user interface after a predetermined time interval has been surpassed subsequent to generation of the first drawing surface.

12. The method of claim 1, further comprising removing the drawing surface from the display in response to a change in the user's gaze direction exceeding a predetermined value.

13. The method of claim 1, wherein the predetermined angle is limited to a range that includes 60 degrees to 90 degrees relative to the gaze direction.

14. The method of claim 1, where the user's gaze direction is visually displayed as a line having a predetermined thickness.

15. A head-mounted computing device comprising:
   a see-through holographic display configured to present a user interface and holographic images;
   instructions stored in memory executable by a processor to:
      determine a user's gaze direction based on a gaze input;
      identify an environmental surface in a real-world 3-dimensional environment;
      determine an intersection between the user's gaze direction and the environmental surface;
      generate a first drawing surface based on the intersection within the user interface on the display, wherein the drawing surface is arranged at a predetermined angle relative to the user's gaze direction, wherein the predetermined angle is determined at least in part based on a characteristic of the 3-dimensional environment; and
      render a first drawing indicia in the drawing surface responsive to receiving a first drawing surface input that includes a path drawn by a user and based on the first drawing surface input, wherein the first drawing indicia is rendered within the user interface on the display and includes one or more lines that denote the path drawn by the user.

16. The computing device of claim 15, where the first drawing surface is planar.

17. A method for operating a head mounted computing device, the method comprising:
   receiving a drawing activation input;
   generating a user's gaze direction in response to receiving the drawing activation input and based on a gaze input;
   determining an intersection between the user's gaze direction and an identified environmental surface in a 3-dimensional environment;
   generating a drawing surface based on the intersection within a user interface on a display, wherein the first drawing surface is arranged at a predetermined angle relative to the user's gaze direction, wherein the predetermined angle is determined at least in part based on characteristics of the 3-dimensional environment;
   receiving a drawing surface input that includes a path drawn by a user; and
   in response to receiving the drawing surface input, rendering a drawing indicia on the drawing surface within the user interface on the display that includes one or more lines that denote the path drawn by the user based on the drawing surface input.

18. The method of claim 17, where the drawing activation input and the drawing surface input are jointly implemented as a continuous input.

* * * * *